United States Patent
Tao et al.

(10) Patent No.: US 7,890,664 B1
(45) Date of Patent: Feb. 15, 2011

(54) METHODS AND APPARATUS FOR NON-DISRUPTIVE UPGRADE BY REDIRECTING I/O OPERATIONS

(75) Inventors: Tao Tao, Cambridge, MA (US); Michael E. Bappe, Loveland, CO (US); Harold M. Sandstrom, Belmont, MA (US); Edith Epstein, Arlington, MA (US); Eric I. West, Brighton, MA (US); Helen S. Raizen, Jamaica Plain, MA (US); Santhosh V. Kudva, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 392 days.

(21) Appl. No.: 12/059,071

(22) Filed: Mar. 31, 2008

(51) Int. Cl.
*G06F 3/00* (2006.01)
*G06F 13/00* (2006.01)
(52) U.S. Cl. .............................. 710/8; 710/15; 710/62
(58) Field of Classification Search ................ None
See application file for complete search history.

(56) References Cited

U.S. PATENT DOCUMENTS

2007/0174849 A1* 7/2007 Cheung et al. .............. 719/321

OTHER PUBLICATIONS

Araki, Hitoshi, A Nonstop Updating Technique for Device Driver Programs on the IROS Platform, 2002, ieee.org [online, accessed on Dec. 16, 2010], URL: http://ieeexplore.ieee.org/stamp/stamp.jsp?arnumber=00525144.*

* cited by examiner

*Primary Examiner*—Tariq Hafiz
*Assistant Examiner*—Scott Sun
(74) *Attorney, Agent, or Firm*—Daly, Crowley, Mofford & Durkee, LLP

(57) ABSTRACT

Methods and apparatus for non-disruptive upgrade by redirecting I/O operations. With this arrangement, a driver upgrade does not require restarting an application. In one embodiment, a method includes installing on a computer a legacy upgrade module in a kernel having a legacy driver with first and second loadable extensions for handling input/output operations for applications to and from devices, retrieving and storing static configuration data from the legacy driver, transferring the stored static configuration data to a new driver, obtaining runtime device configuration data from the devices and transferring the runtime device configuration data to the new driver, and filtering device input/output operations such that prior to cutover input/output operations are directed by the LUM through device stacks for the legacy driver and after cutover input/output operations are directed to the new driver.

8 Claims, 7 Drawing Sheets

METHODS AND APPARATUS FOR NON-DISRUPTIVE UPGRADE BY REDIRECTING I/O OPERATIONS

BACKGROUND

As is known in the art, when performing upgrades of a software application in conventional systems a driver update requires stopping and restarting the applications that rely on the driver. A reboot of the system may be required, which can significantly impact system operation. As is also known, some systems cannot afford to halt services, or have extremely high costs associated with doing so.

One such driver is multipathing software for managing multiple I/O (input/output) paths through a system. Multipathing can be used for load balancing to increase efficiency and to provide failover in response to component failure, for example. When a new multipathing driver upgrade is needed, it may be necessary to stop the applications to effect the upgrade.

SUMMARY

The present invention provides methods and apparatus for non-disruptively enabling driver upgrades by using a legacy upgrade module (LUM) to simultaneously support I/O operations for a legacy driver and I/O operations for an upgrade version of the same driver for the duration of the upgrade procedure. With this arrangement, new functionality can be seamlessly provided. While the invention is primarily shown and described in exemplary multipathing application embodiments in Unix environments, it is understood that exemplary embodiments are applicable to systems in general for which it is desirable to effect non-disruptive driver upgrades.

In one aspect of the invention, a method comprises installing on a computer a legacy upgrade module (LUM) in a kernel having a legacy driver with a first legacy kernel extension module for handling input/output operations for applications to and from devices, retrieving and storing static configuration data from the legacy driver, transferring the stored static configuration data to the legacy update module, a new kernel extension module, and to a first upgrade kernel extension module corresponding to the first legacy kernel extension module to provide a parallel device stack, obtaining runtime device configuration data from the devices and transferring the runtime device configuration data to the LUM, and filtering device input/output operations such that prior to cutover input/output operations are directed by the LUM through device stacks for the legacy driver and after cutover input/output operations are directed to the LUM that includes new driver functionality.

The method can further include one or more of the following features: filtering the input/output operations to the legacy driver by replacing the legacy driver function pointers in a structure referenced by the bdev switch table, configuring the parallel device stack substantially identical to the legacy driver, cutting over on a device-by-device basis from the legacy driver device stacks to new driver parallel stacks, cutting over by suspending I/Os at the top, draining I/Os from the legacy driver, transferring internal reference counters and flags, sending subsequent I/Os to the parallel stack, leaving the legacy driver in place until next reboot, temporarily renaming symbols until next reboot to allow the parallel stacks to coexist in the kernel on the next reboot, swapping into place the new driver based on the same updated kernel code in the LUM that was servicing I/Os in the parallel stacks before reboot, and with the legacy stacks through the cutover process.

In another aspect of the invention, a system comprises a computer having a CPU, disk, and memory interconnected, a series of applications to run on the computer, and stored instructions to enable the computer to perform the steps of: installing on the computer a legacy upgrade module (LUM) in a kernel having a legacy driver with a first legacy kernel extension module for handling input/output operations for applications to and from devices, retrieving and storing static configuration data from the legacy driver, transferring the stored static configuration data to the legacy update module, a new kernel extension module, and to a second kernel extension module corresponding to the first legacy kernel extension module to provide a parallel device stack, obtaining runtime device configuration data from the devices and transferring the runtime device configuration data to the LUM, and filtering device input/output operations such that prior to cutover input/output operations are directed by the LUM through device stacks for the legacy driver and after cutover input/output operations are directed to the LUM that includes new driver functionality.

In a further aspect of the invention, an article comprises machine readable instructions to enable a machine to perform the steps of: installing a legacy upgrade module (LUM) in a kernel having a legacy driver with a first legacy kernel extension module for handling input/output operations for applications to and from devices, retrieving and storing static configuration data from the legacy driver, transferring the stored static configuration data to the legacy update module, a new kernel extension module, and to a second kernel extension module corresponding to the first legacy kernel extension module to provide a parallel device stack, obtaining runtime device configuration data from the devices and transferring the runtime device configuration data to the LUM, and filtering device input/output operations such that prior to cutover input/output operations are directed by the LUM through device stacks for the legacy driver and after cutover input/output operations are directed to the LUM that includes new driver functionality.

BRIEF DESCRIPTION OF THE DRAWING

The foregoing features of this invention, as well as the invention itself, can be more fully understood from the following drawings in which.

DETAILED DESCRIPTION

In general, exemplary embodiments of the present invention provide non-disruptive driver upgrades in systems, such as Unix-based systems having a bdev switch table for drivers. Applications send read and write I/Os non-disruptively during the upgrade. A legacy upgrade module (LUM) is installed in the kernel to enable the upgrade of a driver non-disruptively. In one embodiment, the LUM is loaded on a running system in such a way that the LUM filters the I/Os directed to the running driver by replacing the running driver's entry point function pointers in the appropriate structure referenced in the bdev switch table. While the existing driver is handling normal read/write/ioctl I/Os, the filter module redirects special configuration ioctls from so-called userland to configure a parallel device stack that is identical to that of the running driver. As is known in the art, userland refers to a set of libraries provided by the operating system for performing I/O operations or otherwise interacting with the kernel.

As described more fully below, cutting over on a device-by-device basis from the running driver's device stack to the new parallel stack includes suspending I/Os at the top of the I/O stack, draining I/Os from running driver, transferring internal reference counters and flags, and then sending subsequent I/Os to the parallel stack. The LUM orchestrates the cutover.

In one embodiment, the existing driver is left in place until the next reboot in order to preserve the driver's presence in the bdev switch table. On the next reboot, a new driver based on the same updated kernel code that was servicing I/Os in the parallel stacks before the reboot is swapped into place. A persistent file image of the driver's configuration is used to transfer the running configuration during the upgrade. Effecting the transfer can include temporarily renaming symbols until the next reboot to allow the parallel stacks to coexist in the kernel with the legacy stacks.

Figure 1:
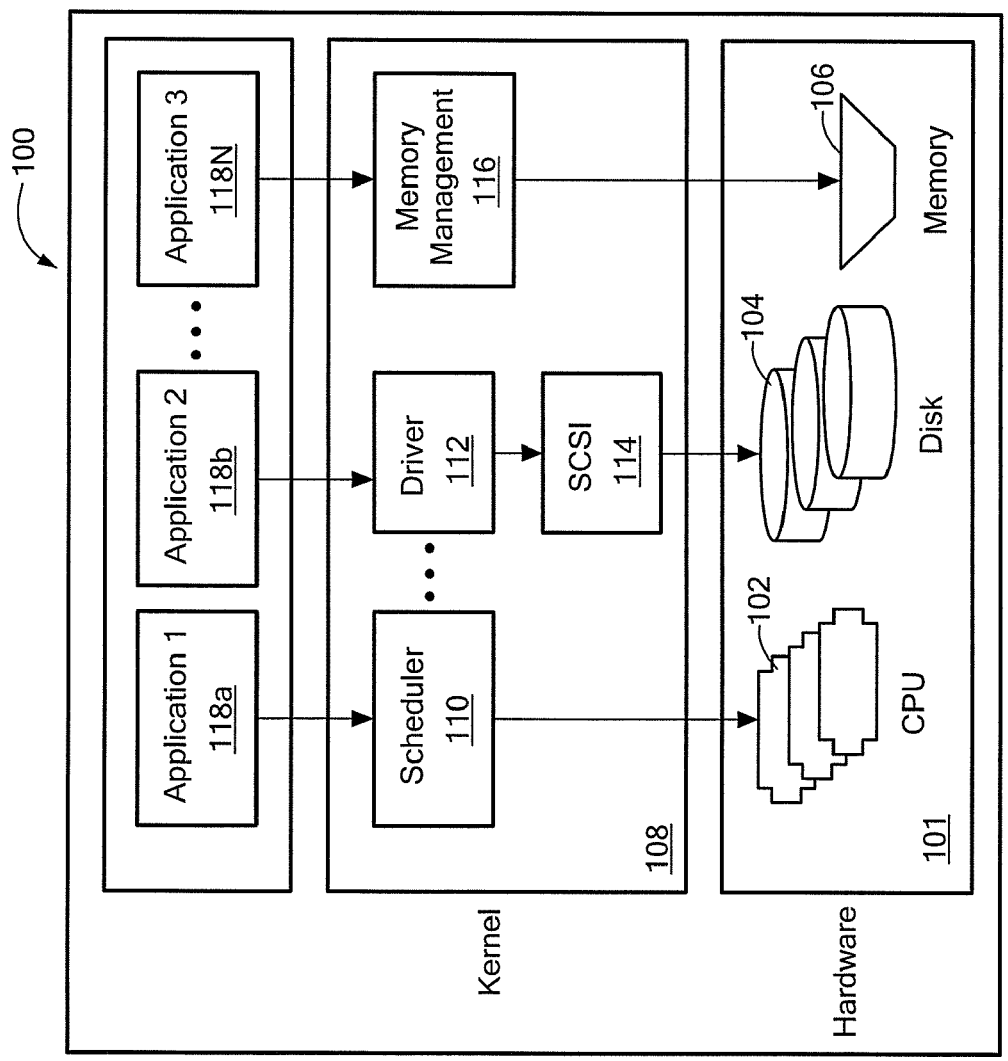
FIG. 1 is a block diagram showing a host with a device driver installed where applications send I/Os to the disk through the device driver.

FIG. 1 shows a system 100 having non-disruptive driver upgrades in accordance with exemplary embodiments of the invention. The system 100 includes hardware 101 components CPU 102, disk drives 104, and memory 106. The hardware components 101 can be conventional components well known to one of ordinary skill in the art or can be highly customized without departing from exemplary embodiments of the invention. The hardware supports a kernel 108 including a scheduler component 110, a driver 112 interacting with a SCSI component 114, and a memory management component 116. A series of applications 118a-N can run under the operating system on the hardware 101. As is well known, drivers are required to interact with the applications. As applications are required to use the new functionalities of the newer drivers, upgrade of drivers are needed.

Figure 2:
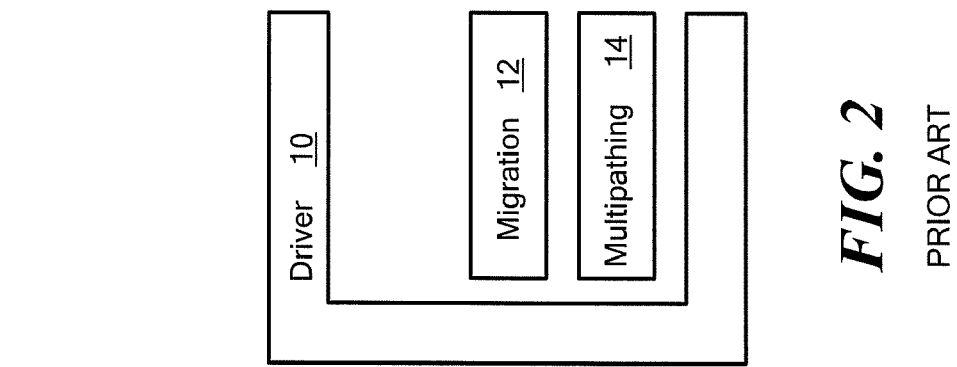
FIG. 2 is a block diagram of a prior art configuration having a driver which includes a base driver and loadable extension modules in a device stack implementation.

FIG. 2 shows a prior art configuration of a driver having a base driver 10 and loadable extensions for exemplary applications shown here as multipathing 12 and data migration 14. The driver handles I/Os between the applications and their target devices and supports various features for the applications in a manner well known to one of ordinary skill in the art. An exemplary multipathing application is provided as POWERPATH by EMC Corporation of Hopkinton, Mass. Applications send write data to the driver; the driver's multipathing extension 12 forwards the write data to the best candidate path, based on the multipathing algorithm, to the underlying device. In a similar way, read data from the underlying device can be directed by the multipathing extension 12 through the best candidate path. Applications that use the multipathing extension can improve data transfer robustness and performance.

To add new driver functionality new kernel modules may be required. A new feature can be added to the driver, such as a data encryption facility for securing data on the underlying device. However, to add the new drivers/functionality it may be necessary to shut down the system and reboot in order to effect use of the new drivers, which results in significant disruption. One of ordinary skill in the art will readily appreciate the implications in cost and inconvenience when rebooting high availability enterprise systems, for example.

Figure 3:
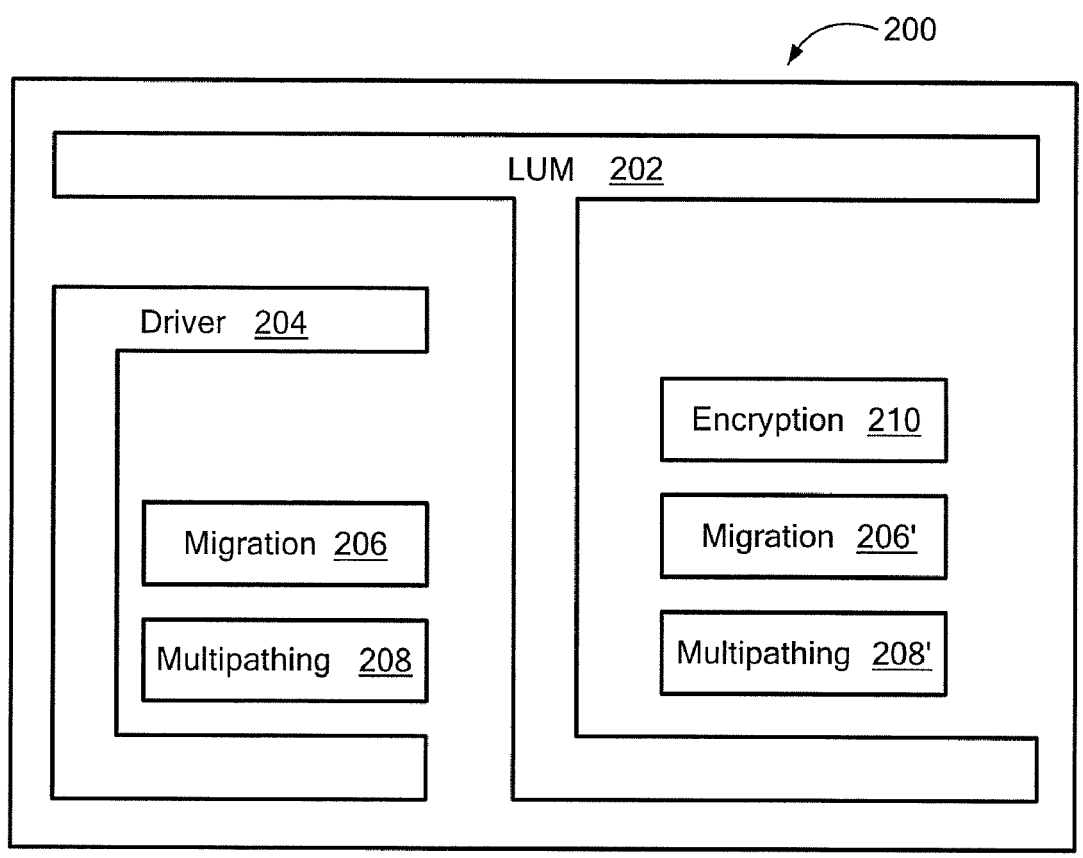
FIG. 3 is a block diagram showing a Legacy Upgrade Module (LUM) installed along with new kernel extension modules.

FIG. 3 shows an exemplary system 200 having a legacy upgrade module (LUM) 202 for providing driver updates non-disruptively in accordance with exemplary embodiments of the invention. To provide non-disruptive drive updates, static and runtime device configuration data need is transferred from the old version of the driver to the new version of the driver, as described in detail below.

The LUM 202 resides in the kernel to intelligently direct I/O operations to the legacy base driver 204 for a migration component 206 and a multipathing component 208 or to an updated migration module 206', an updated multipathing module 208' or a new encryption module 210. Thus, new functionality, shown as encryption 210, with new drivers, can be added non-disruptively. That is, I/O operations for the legacy components 206, 208 and updated components 206', 208' are supported after installation of the updated components 206, 208 and new component 210 without requiring shutdown.

Figure 4:
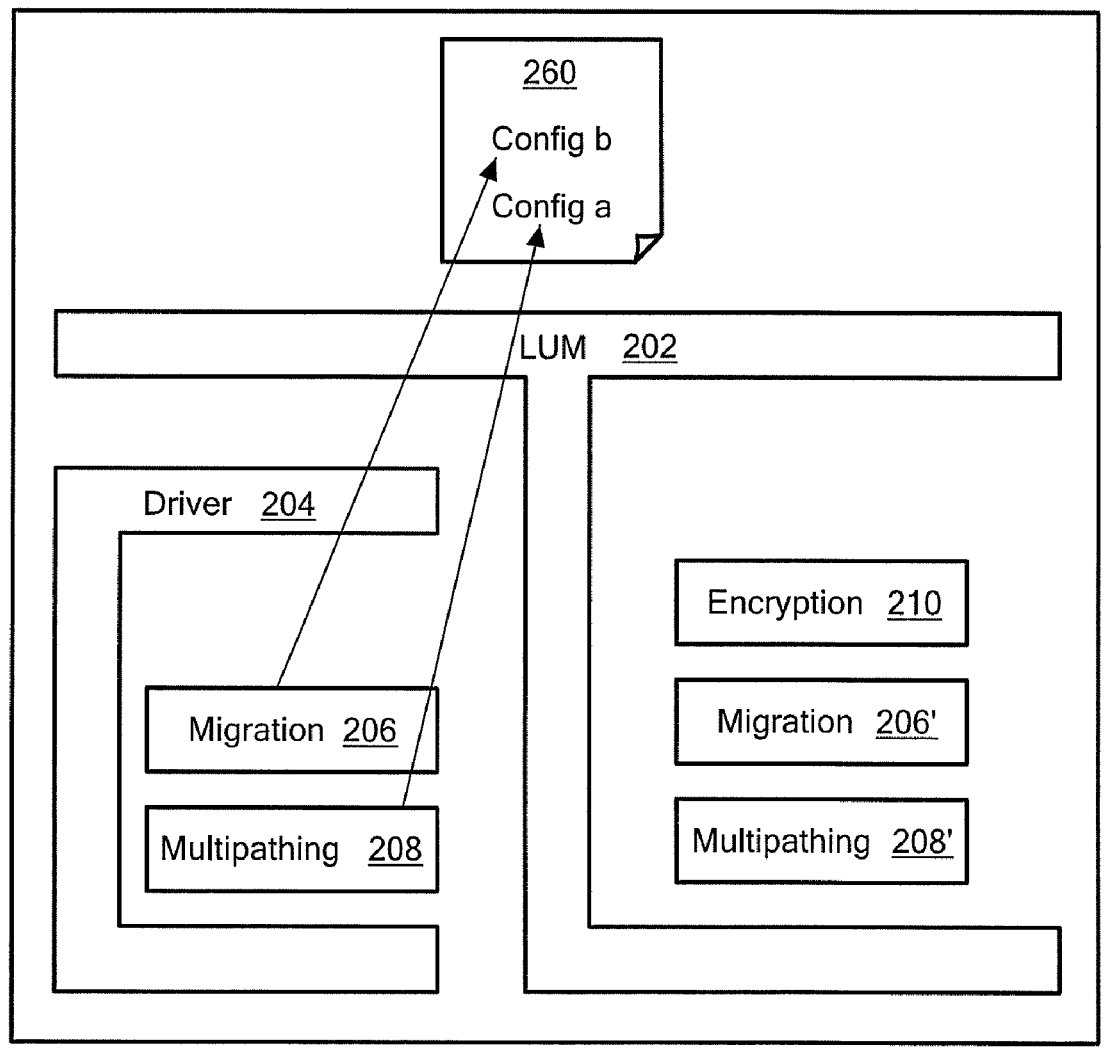
FIG. 4 is a block diagram showing exemplary use of userland commands to retrieve device configuration information from the old version of the driver and for storage in a persistent file.
Figure 5:
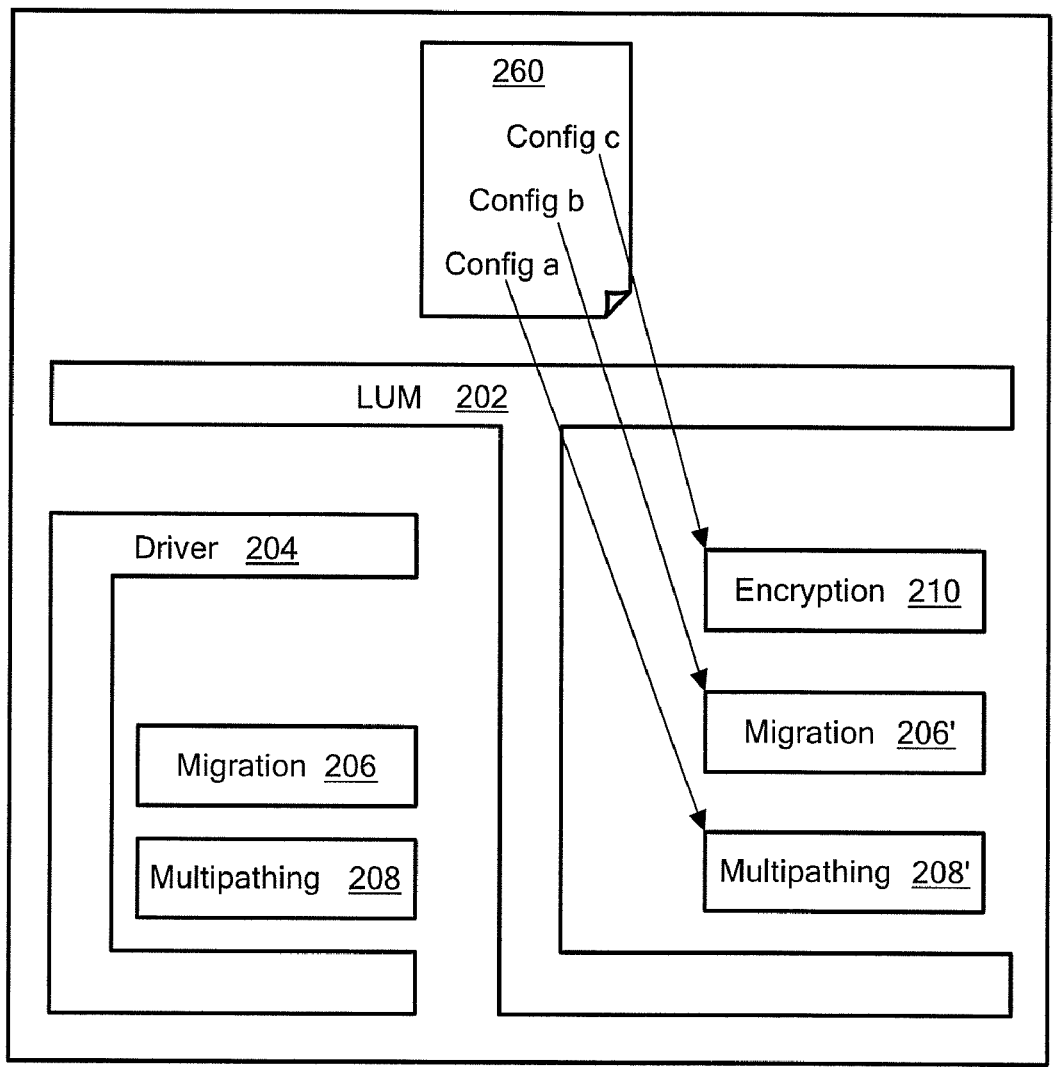
FIG. 5 is a block diagrams showing exemplary use of userland commands to reconstruct the device configuration tree for the new version of the driver using the saved configuration file.
Figure 6:
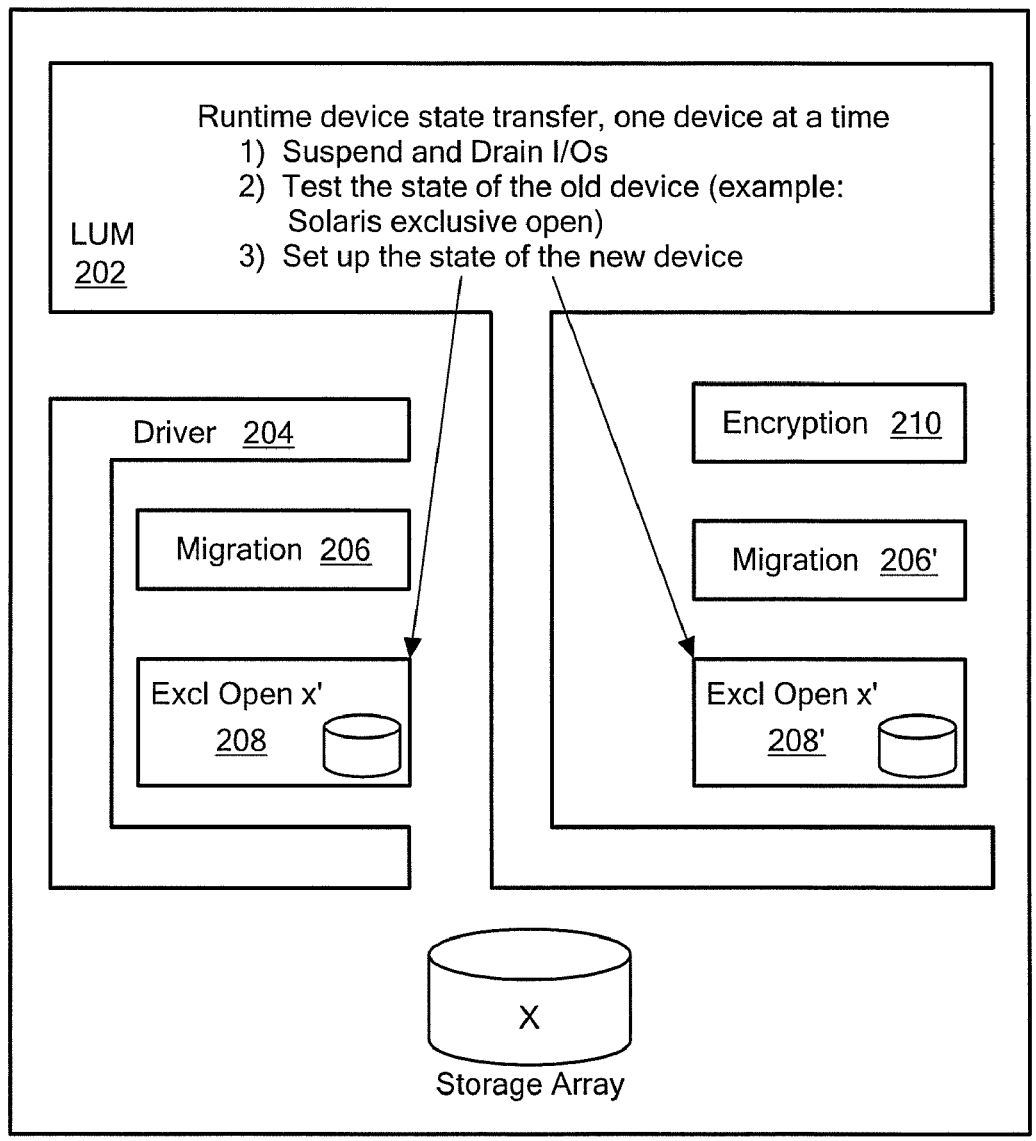
FIG. 6 is a block diagram showing runtime cutting over a device stack from the old version of the driver to the new version.

As shown in FIGS. 4 and 5, which have some commonality with FIG. 3 where like reference numbers indicate like elements, static device configuration data is retrieved (FIG. 4) from the old version of the driver and transferred (FIG. 5) to the new one. Runtime device configuration data is transferred one device at a time from the old version of the driver to the new one, as shown in FIG. 6. FIG. 4 shows an example of using userland commands to retrieve the device configuration information from the old version of the driver and store in a persistent file. FIG. 5 shows an example of using userland commands to reconstruct the device configuration tree for the new version of the driver using the saved configuration file. Any new configuration is applied to the new device stacks as well. FIG. 6 shows an example of runtime cutting over a device stack from the old version of the driver to the new version. This includes the runtime device state transfer from the old version of the driver to the new one.

In this example, the legacy driver 204 supports multipathing and data migration via first and second kernel extension modules 206, 208. Data encryption is added to the new version of the driver, i.e., the LUM 202, via a third kernel extension module 210. The LUM 202 supports the updated multipathing 208' and data migration 206' kernel extensions, as well as the new encryption module 210.

In order to provide non-disruptive driver upgrades, the LUM 202 is installed along with the new kernel extension modules 206', 208', 210. In order to filter I/Os going to the old driver 204, 206, 208, the LUM 202 first builds a new device tree representing the devices currently managed by the old driver. As is well known to one of ordinary skill in the art, a device tree refers to a way of organizing the devices, where each node of the tree represents a device. A device tree may be any digital tree such as a binary tree, a btree, or a judy tree, such that fast add-lookup-delete capabilities for a set of representative device structures are supported.

The LUM 202 and the new kernel extension modules 206', 208', 210 represent the functionalities of the new version of the driver. The LUM 202 is installed to provide filtering of any I/Os directed to a running driver by replacing the running driver's function pointers in the appropriate structures referenced via the bdev switch table. A bdev switch table is well known to one of ordinary skill in the art of Unix programming and systems. U.S. Pat. No. 5,675,781 to Duncan et al., which is incorporated herein by reference, discloses volume management using bdev.

Figure 7:
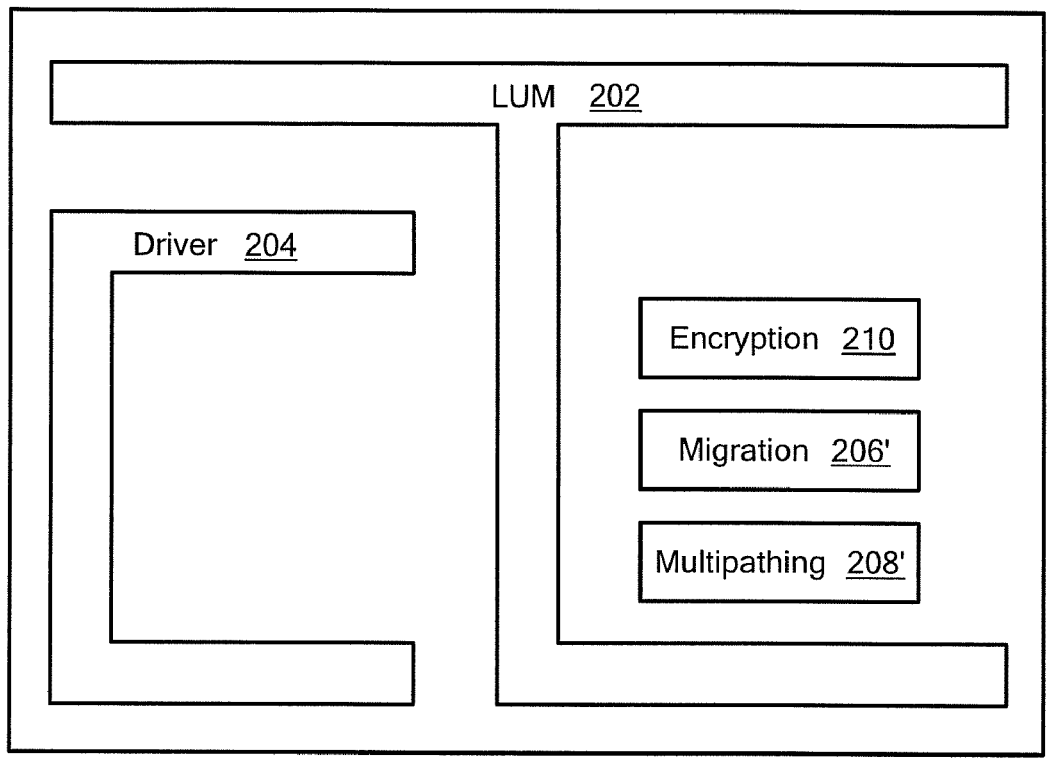
FIG. 7 is a block diagram including components that remain in the system after I/Os are redirected from the old version of the driver to the new driver.
Figure 8:
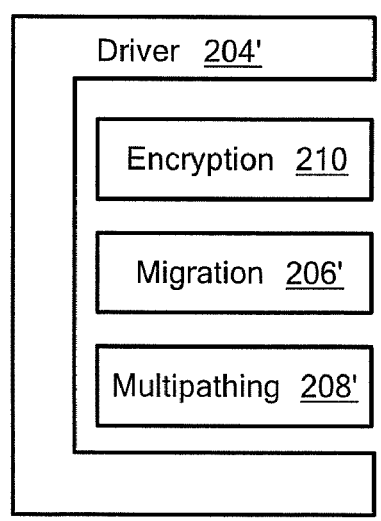
FIG. 8 is a block diagram showing the components of the driver after reboot.

It is understood that the driver includes a base driver and kernel extensions 210, 206' and 208' and that LUM is the module version of the new base driver 204' (FIG. 8). The LUM 202 (FIG. 7) and the new base driver 204' represent the same functionality. However, it is desirable to avoid having two drivers in the system at the same time. In an exemplary embodiment, the new base driver 204' is installed as a module (LUM) and then replaced by a new base driver at the next reboot. In one embodiment, the new driver 204' and the LUM 202 are built from the same upgraded driver code. That is, the LUM is not a driver per se, but rather a loadable kernel module that filters the running driver's entry points and inserts new driver code that supercedes the running driver code. On next reboot the LUM is not loaded; rather a new driver built from the same upgraded code as the LUM is loaded. It is understood that the LUM is a combination of driver-specific code and upgrade-specific code.

FIG. 4 shows exemplary procedures to retrieve the static device configuration data from the old version of the driver. The LUM 202 freezes the static device configuration data of the old version of the driver, retrieves the device configuration data from the old version of the driver, and saves the device configuration data in a persistent file image 260. The LUM then allows configuration updates to the new device stacks, including those loaded from the file image. The old driver configuration remains frozen for good, and is abandoned completely after device cutover.

It is understood that static configuration data can include a wide variety of data. Exemplary static data configuration includes intiator-target-lun path id mapping to storage world wide name, device node (major-minor number) mapping to storage volume world wide name, active versus standby mode for a path id, load balancing policy for a storage volume, and migration mapping of one storage volume to another, encryption setting of a storage volume.

FIG. 5 shows exemplary procedures to use the commands to set up a new device configuration tree for the LUM 202 including adding devices, setting modes of the volumes and devices, and incorporating default configuration data for the new features. This can include processing each device in the persistent file image 260 and adding it to the new device configuration tree, testing whether the path of the device to its targeting disk is alive or dead through sending ioctls and setting the modes accordingly. It is understood that the running driver's device tree points to the old device stacks, and the LUM's tree points first to the old stacks and then to the new device stacks after cutover. An example of config c (FIG. 5) to configure the new encryption module can be information that sets the device as unencrypted device, e.g., the initial state of a device when encryption extension is added.

The runtime device configuration transfer is performed during the cutover process one device at a time in order to minimize the delay for the applications. Before cutover, all I/Os are sent through the device stacks of the old driver. After cutover, all I/Os are redirected to the device stacks of the new driver.

It is understood that runtime device configuration includes the transient states and to internal counters of the device. An example of a cross-platform run-time state is Persistent Reserve Out Registered for a storage volume. A test for Persistent Reserve Out Registered for a storage volume includes sending a Registration with a zero reservation key down all paths and testing each for RESV CONFLICT, which if seen on at least one path indicates a registration is in place for the volume. The key can then be read and transferred to the new device stack to be saved in the multipath layer.

An example of a platform-specific run-time state is Solaris exclusive open. These are transient states that are not stored persistently (for next reboot) in the static device configuration image. They must be either deduced by special tests or read directly and atomically during device stack cutover. Atomicity of the tests with the cutover is ensured by draining IOs prior to cutover and suspending I/Os during cutover. A test for exclusive open in a storage volume could be as simple as sending an open to the volume and check for EBUSY return.

A test for layered open counts in a device or volume could be to count the number of closes it takes before an exclusive open succeeds. The layered opens are restored after the test.

FIG. 6 shows an example of a single device cutover for simplicity and ease of understanding. The LUM 202 suspends and drains I/Os to the device stacks of the old driver 204, thus freezing the state of the device. The LUM 202 gets the states of the device of the old driver 204 by sending down testing tasks, for example, the exclusive open state. The LUM 202 sets up the new states of the device of the new driver. For example, the LUM 202 can send exclusive open to set the exclusive open state of the device, the LUM records that it has fabricated an exclusive open during the cutover so it knows to close it properly when the application closes it later.

After the runtime configuration of the devices is transferred, I/Os are directed to the new version of driver. If the platform and implementation permit dynamically unloadable kernel modules, the kernel extensions of the old driver can be removed from the system after destroying the old driver's drained device stacks. An implementation that uses hard-coded dependencies between running modules might prevent dynamic unloading.

The old driver stays in the system until next reboot to maintain the bdev switch table presence. FIG. 7 shows the block diagram of the upgraded driver after the runtime configuration is completed.

Some cleanup and renaming of the kernel and userland modules are required during the first reboot after the upgrade. After reboot, only the new version of the driver is in the system. FIG. 8 shows an example of the components of the new driver after reboot. The LUM is gone with the new driver 204' now in place.

Figure 9:
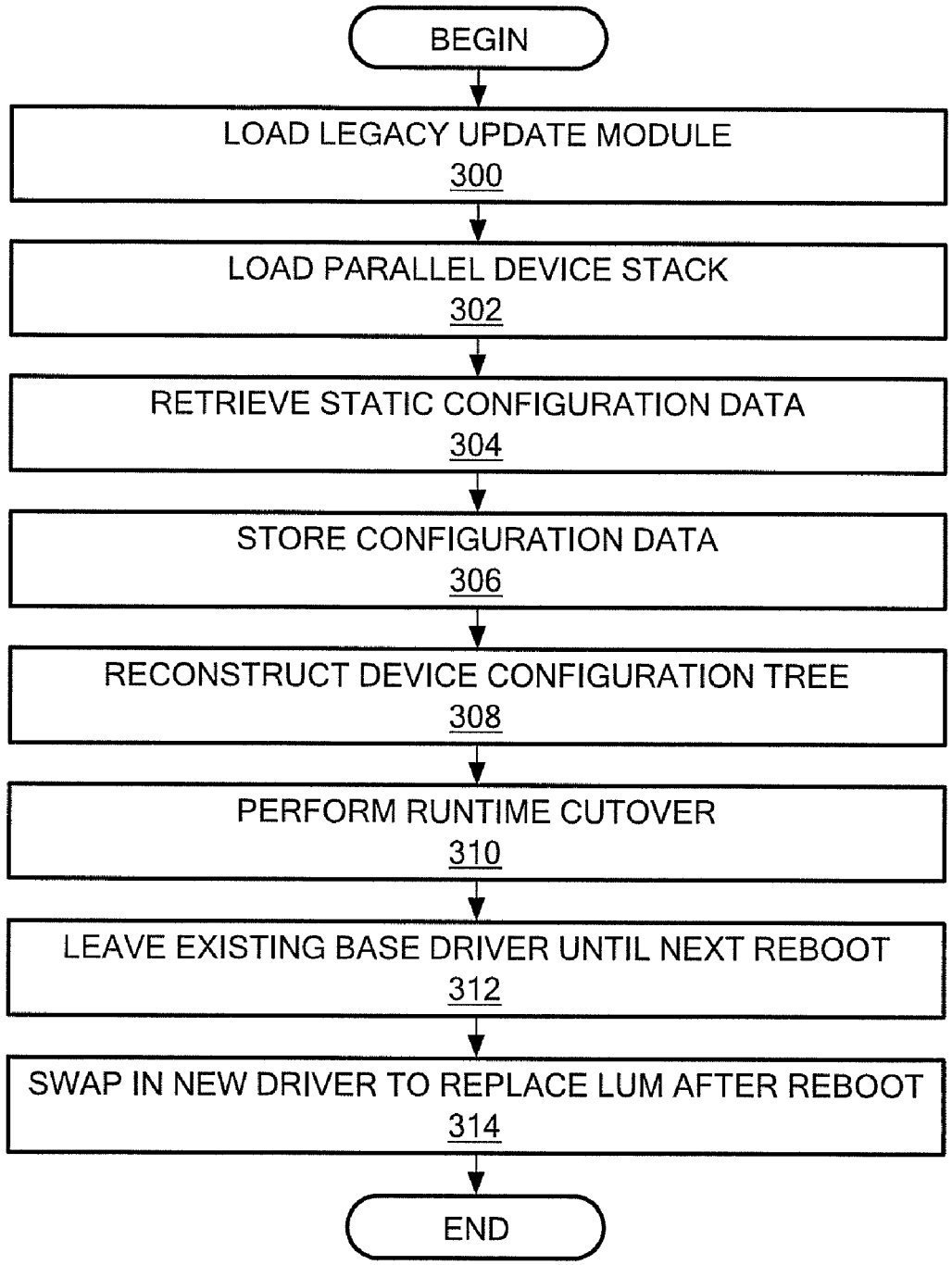
FIG. 9 is a flow diagram showing an exemplary sequence of steps for providing non-disruptive upgrades.

FIG. 9 is a flow diagram showing an exemplary sequence of steps for implementing non-disruptive upgrades in accordance with exemplary embodiments of the invention. In step 300, a legacy upgrade module (LUM) is loaded on a running system in such a way that it filters the I/Os directed to the legacy driver by replacing its function pointers in the appropriate structure referenced by the bdev switch table. In step 302 a parallel device stack is loaded, which can include new functionality. Static configuration data for devices is retrieved from the legacy driver in step 304 and stored in a persistent storage in step 306 after any necessary configuration image format conversion. In step 308, the device configuration tree is reconstructed for the new driver using the data in the persistent storage. The LUM redirects special configuration ioctls from userland to configure a device stack that runs parallel to that of the running driver and the system then performs runtime cutover for a device stack from the legacy driver to the new driver in step 310. The system 'cutover' is on a device-by-device basis from the running driver's device stacks to the new driver's parallel stacks. The cutover includes suspending I/Os at the top, draining I/Os from running driver, transferring internal reference counters and flags, and then sending subsequent I/Os to the parallel stack. The LUM orchestrates the cutover.

In step 312, the existing base driver is left in place until next reboot in order to preserve the upgraded driver's presence in the bdev switch table at its designated major number index. On the next reboot in step 314 there is swapping into place a new driver based on the same updated kernel code that was servicing I/Os in the parallel stacks before reboot. It is understood that the LUM can temporarily rename symbols until the next reboot to allow the parallel stacks to coexist in the kernel with the legacy stacks through the cutover process.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:

installing on a computer a legacy upgrade module (LUM) in a kernel, the kernel having a legacy driver with a first legacy kernel extension module for handling input/output operations for applications to and from devices;

retrieving and storing static configuration data from the legacy driver;

transferring the stored static configuration data to the LUM, to a new kernel extension module, and to a first upgrade kernel extension module corresponding to the first legacy kernel extension module to provide a parallel device stack;

obtaining runtime device configuration data from the devices and transferring the runtime device configuration data to the LUM;

filtering device input/output operations such that prior to cutover input/output operations are directed by the LUM through device stacks for the legacy driver and after cutover input/output operations are directed to the LUM that includes new driver functionality.

2. The method according to claim 1, further including filtering the input/output operations to the legacy driver by replacing the legacy driver function pointers in a structure referenced by a bdev switch table.

3. The method according to claim 1, further including configuring the parallel device stack substantially identical to the legacy driver.

4. The method according to claim 1, further including cutting over on a device-by-device basis from the legacy driver device stacks to new driver parallel stacks.

5. The method according to claim 4, further including cutting over by suspending I/Os at the top, draining I/Os from the legacy driver, transferring internal reference counters and flags, and sending subsequent I/Os to the parallel stack.

6. The method according to claim 1, further including leaving the legacy driver in place until next reboot.

7. The method according to claim 6, further including, on the next reboot, swapping into place the new driver based on the same updated kernel code in the LUM that was servicing I/Os in the parallel stacks before reboot.

8. The method according to claim 1, further including temporarily renaming symbols until next reboot to allow the parallel stacks to coexist in the kernel with the legacy stacks through the cutover process.

* * * * *